United States Patent
Liu et al.

(10) Patent No.: US 7,575,610 B2
(45) Date of Patent: Aug. 18, 2009

(54) COMPACT PRODUCTION OF REFORMATE AND SEGREGATED $H_2$, $N_2$ AND $CO_2$

(75) Inventors: Ke Liu, East Longmeadow, MA (US); Eric A. Rohrbach, Lebanon, CT (US)

(73) Assignee: UTC Power Corporation, South Windsor, CT (US)

( * ) Notice: Subject to any disclaimer, the term of this patent is extended or adjusted under 35 U.S.C. 154(b) by 782 days.

(21) Appl. No.: 10/862,653

(22) Filed: Jun. 7, 2004

(65) Prior Publication Data

US 2005/0268554 A1 Dec. 8, 2005

(51) Int. Cl.
*B01J 7/00* (2006.01)
(52) U.S. Cl. .......................................... 48/61
(58) Field of Classification Search .............. 48/61, 48/62 R, 71–118.5
See application file for complete search history.

(56) References Cited

U.S. PATENT DOCUMENTS

| | | | |
|---|---|---|---|
| 3,847,564 A * | 11/1974 | Marion et al. | 48/95 |
| 5,167,838 A * | 12/1992 | Wilensky | 210/768 |
| 5,271,916 A * | 12/1993 | Vanderborgh et al. | 423/246 |
| 6,126,908 A * | 10/2000 | Clawson et al. | 422/190 |
| 6,455,011 B1 * | 9/2002 | Fujimura et al. | 422/139 |
| 6,713,040 B2 * | 3/2004 | Ahmed et al. | 423/652 |
| 7,033,822 B2 * | 4/2006 | Maston | 435/290.1 |
| 2001/0049906 A1 * | 12/2001 | Shimazu | 48/76 |
| 2003/0014918 A1 * | 1/2003 | Burch et al. | 48/61 |
| 2003/0203251 A1 * | 10/2003 | Brundage et al. | 429/19 |
| 2004/0050067 A1 * | 3/2004 | Sprouse et al. | 60/774 |
| 2006/0102493 A1 * | 5/2006 | Grouset et al. | 205/628 |

* cited by examiner

*Primary Examiner*—Alexa D Neckel
*Assistant Examiner*—Imran Akram
(74) *Attorney, Agent, or Firm*—M. P. Williams

(57) ABSTRACT

Substantially pure oxygen is provided to an up flow reformer (49a) from a separator (108) downwardly impelled water droplets (53) mix with the outflow (58) of a CPO (59), flowing upwardly through high temperature (68) and low temperature (73) water gas shift reactors. The reformer output flows through a mixer (79) to a down-flow PrOx containing two beds (82, 94) of preferential CO oxidation catalyst therein. A series of compressors (120-122) compress water and carbon dioxide out of the gaseous flow to provide pure, pressurized hydrogen. Oxygen (111) is separated (105, 108) from nitrogen (112).

7 Claims, 3 Drawing Sheets

COMPACT PRODUCTION OF REFORMATE AND SEGREGATED $H_2$, $N_2$ AND $CO_2$

TECHNICAL FIELD

This invention relates to efficient and compact production of (1) hydrogen-containing reformate, as well as (2) segregated pure high pressure hydrogen, such as may be used for fueling stations, (3) nitrogen and (4) carbon dioxide.

BACKGROUND ART

The generation of hydrogen-containing reformate from hydrocarbon fuels, for various purposes such as regeneration of adsorbents used to trap oxides of nitrogen in the exhaust of internal combustion engines, particularly diesel engines, is accomplished in various ways. In a typical system, hydrocarbon fuel is desulfurized and preheated, mixed with air, and passed through some form of reformer, typically a catalytic partial oxidizer, a non-catalytic homogenous partial oxidizer, an auto-thermal reformer, and the like. If reformate is to be utilized, for instance, as fuel for a fuel cell power plant, which produces electricity from hydrogen and oxygen (typically air), the carbon monoxide in the hydrogen-rich gas must be removed because carbon monoxide poisons the fuel cell catalyst.

One type of hydrogen reformate generator known to the prior art is illustrated in FIG. 1. In FIG. 1, a fuel processing system 6 comprises a reformer tower 7 and a preferential CO oxidizer (PrOx) tower 8. In the tower 7, preheated, desulfurized fuel enters an inlet 11 along with humidified air at an inlet 12. The two are combined in a mixer 14 before passing into a catalytic partial oxidizer (CPO) 15. The output of the CPO is mixed in inert packing 16 with water provided at an inlet 17 and sprayed as droplets over the packing by a nozzle 18. The components of the CPO outlet are typically some hydrogen, $CO_2$, CO and a significant amount of unreformed hydrocarbon fuel. Mixing that with water in the inert packing 18 prepares the mix for conversion in a high temperature water/gas shift reactor 20, the output of which is passed through a heat exchanger 21. As is known, the water/gas shift reaction converts water and CO to $CO_2$ and hydrogen. Then, the product is processed again in a low temperature water/gas shift reactor 22 before passing through the outlet 25 of the tower 7 into a mixer 26. The coolant received at an inlet 27, heated within the heat exchanger 21 and passing through an outlet 28 may be utilized, under proper conditions, to preheat the desulfurized fuel.

The flow from the reformer tower 7 has air from an inlet 29 mixed therewith in the mixer 26 and then enters the bottom of the tower 8, first passing through another heat exchanger 30 and then through packs 31 of preferential carbon monoxide oxidizer catalyst. The upward flow is mixed with air from an inlet 32 in a mixer 32a and then flows through another heat exchanger 33 which receives coolant at an inlet 34 and provides coolant at its outlet 35 to an inlet 36 of the heat exchanger 30. The coolant at the outlet 38 of the heat exchanger may be utilized, under proper conditions, for preheating fuel or other purposes in ancillary apparatus, all as is known.

The cooled upward flow is passed through additional packs 40 of preferential carbon monoxide oxidizer catalyst and then through a final heat exchanger 41 that receives coolant at an inlet 42 and provides coolant at an outlet 43, which may be used for heating and related processes. The output from the heat exchanger 41 at an outlet 45 of the oxidizer tower is hydrogen rich reformate with on the order of 100 parts per million of carbon monoxide, in the usual case, along with small amounts of carbon dioxide and trace amounts of other gases, including some unreformed hydrocarbon fuel.

As is known, the fuel for such a device may be natural gas, gasoline, diesel fuel, liquified petroleum gas, and other hydrocarbon fuels.

Problems with the apparatus described with respect to FIG. 1 include insufficient residence time for water droplets in the inert packing 16 to become fully vaporized; un-vaporized water may drain into the shift reactor 20 and damage the shift catalyst therein.

Therefore, less water may be used for safety, and the conversion to hydrogen within the shift reactor 20 may be water-starved and thus leave an excess of carbon monoxide, which may overburden the shift reactor 22.

The up flow in the tower 8 requires the use of packs of captured catalysts, such as by netted mesh, which is not only expensive but upon which sufficient catalyst cannot be wash coated, unless large volume packs are utilized. Stated alternatively, to achieve sufficient wash coat on the catalysts may require a larger volume of catalyst than can be accommodated in the space available in certain applications.

In the production of hydrogen, it has heretofore been known to generate reformate, as described hereinbefore, and separate the hydrogen by means of a pressure swing adsorption system, as shown in U.S. Pat. Nos. 5,961,928 and 6,051,192, which results in a loss of some of the hydrogen during purges, and therefore reduces the efficiency of the process. The hydrogen may thereafter be pressurized, within storage/dispensing containers.

DISCLOSURE OF INVENTION

Objects of the invention include provision of a compact fuel processing system for generating hydrogen-containing reformate in reduced space; generation of segregated hydrogen, nitrogen and carbon dioxide efficiently and at low cost; generating high pressure pure hydrogen in an efficient manner; generating hydrogen, nitrogen and carbon dioxide in a compact fuel processing apparatus; improved generation of hydrogen-containing reformate with less than 10 parts per million of carbon monoxide; and avoiding hydrogen waste which occurs with other hydrogen processing systems, such as pressure swing adsorption systems.

According to the present invention, a fuel processing system utilizes an up-flow reformer tower in which the water is introduced downwardly, in counterflow with the output of a generator of hydrogen-rich gas, such as a catalytic partial oxidizer, thereby providing superior mix of the water and hydrogen/CO mixture; the up flow design results in complete vaporization of the water before reaching the water/gas shift reactors, which allows use of smaller catalytic packages by as much as one-third, thereby significantly reducing the pressure across the reformer tower; because there is greater evaporation and the up flow design includes protection for the CPO, more water may be injected into the process, thereby ending up with less carbon monoxide in the output of the fuel processing system.

According further to the invention, a down-flow preferential CO oxidizer tower includes at least one bed of loose pellets having a preferential carbon monoxide oxidizer catalyst therein, which is inexpensive, easily catalysized, and presents more surface area to the gas therein.

In accordance with the invention, a fuel processing system making reformate from which pure hydrogen is to be provided separates inlet air into substantially pure oxygen and nitrogen, utilizing oxygen instead of air to feed the CPO and the preferential carbon monoxide oxidizers in the fuel processing system results in pure hydrogen having no nitrogen therein; this aspect of the invention significantly reduces the volume of gas flowing through the system and allows it to be made very compact. The invention therefore provides pure nitrogen for any segregated use; the invention requires no steam in the hydrocarbon feed stock which renders the fuel processing system not only inexpensive, but also very easy to operate.

In further accord with the present invention, pure hydrogen is produced from nitrogen-free, CO-free reformate, by compressing water and carbon dioxide out of the mix.

Other objects, features and advantages of the present invention will become more apparent in the light of the following detailed description of exemplary embodiments thereof, as illustrated in the accompanying drawing.

MODE(S) FOR CARRYING OUT THE INVENTION

Figure 2:
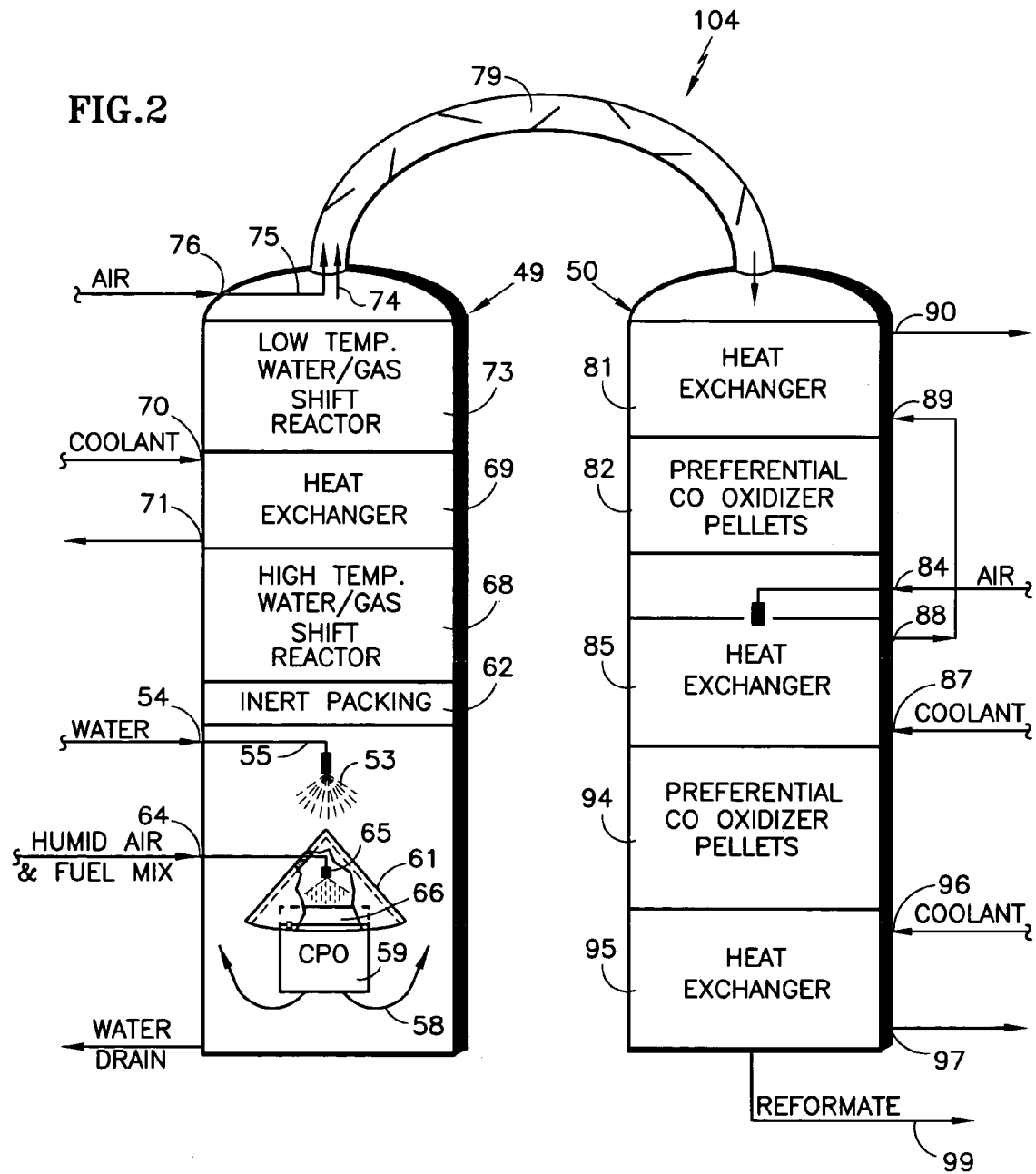
FIG. 2 is a simplified, stylized schematic diagram of a reformate generator in accordance with the present invention.

Referring to FIG. 2, a fuel processing system 104 for generating hydrogen-rich reformate, in accordance with the present invention, includes an up-flow reformer and water/gas shift reactor tower 49 and a down-flow preferential carbon monoxide oxidizer (PrOx) tower 50. A major difference between the fuel processing system 48 and those known to the prior art is that the flow of water droplets 53 formed with water from an inlet 54 by a nozzle 55 is counter to the flow of the hot, output 58 of the CPO 59. The CPO 59 is protected from the water by a shield 61. This causes both complete mixing as well as complete vaporization of the water droplets before reaching the hot, inert packing 62. Furthermore, since the water is sprayed downwardly, and is in counter flow with the CPO output 58, there is a greater residence time of water droplets, especially the bigger water droplets, to assist mixing and full vaporization of even the larger water droplets before reaching the inert packing 62.

A humid air/fuel mixture is received at an inlet 64 and sprayed by an atomizing nozzle 65 onto a distributor 66 comprising a bed of inert packing which helps to distribute and assists vaporization of the water droplets, due to the heat provided to the inert packing 66 by the CPO 59.

Figure 1:
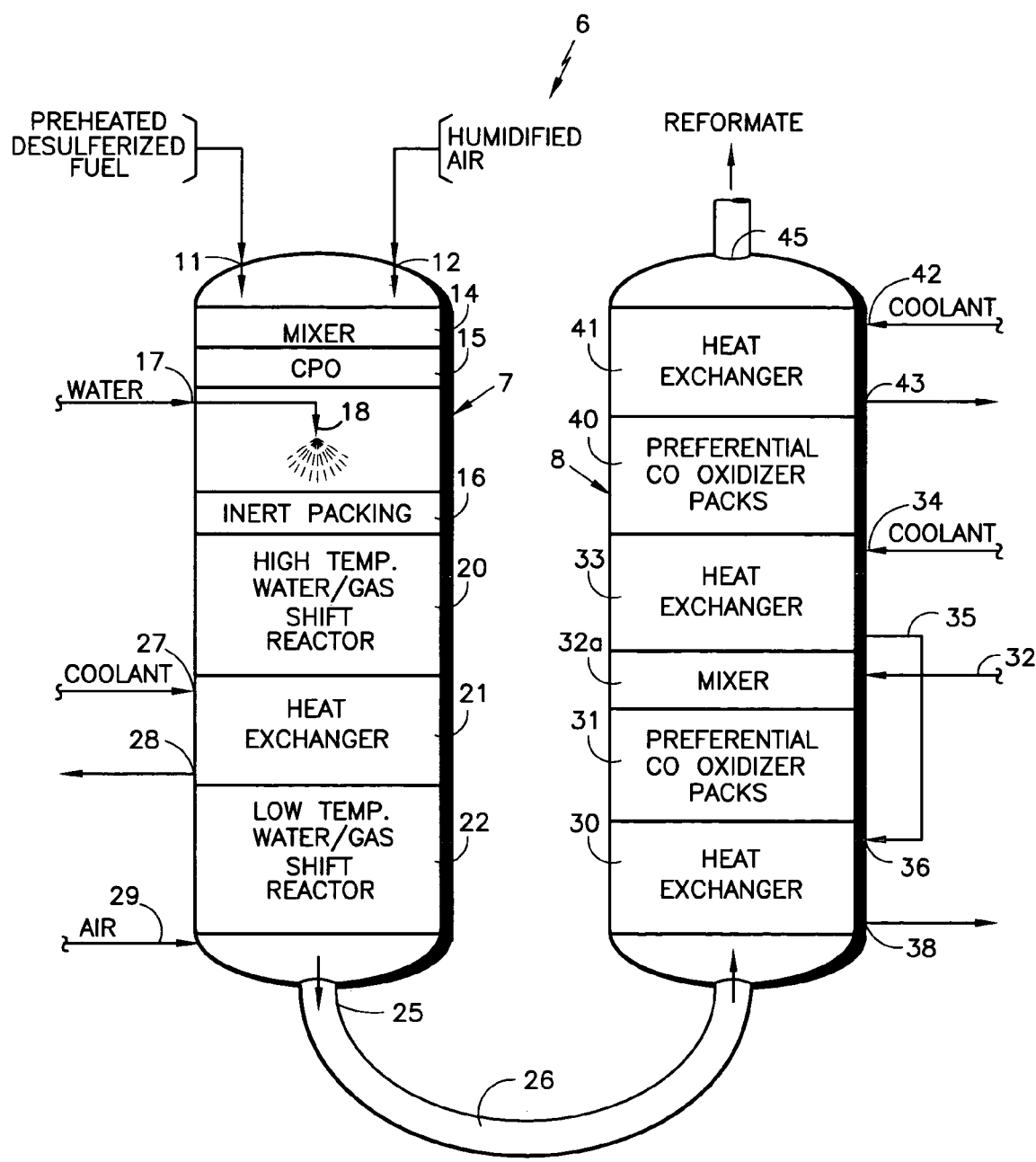
FIG. 1 is a simplified, stylized schematic diagram of a fuel processing system known to the prior art.

When the water droplets 53 mix with the hot CPO output 58 passing through the distributor 62, it flows into a high temperature water/gas shift reactor 68, which can be conventional, except that it can be much smaller than one required in a system described with respect to FIG. 1 known to the prior art. The output of the shift reactor 68, which contains some hydrogen, some carbon dioxide and some carbon monoxide, flows into a heat exchanger 69 having water inlet 70 and a water outlet 71, to be cooled sufficiently to be applied to a low temperature water/gas shift reactor 73, which is conventional except that it may be much smaller than one used in the prior art system.

The upward flow 74 is then mixed with a flow of air 75 from an inlet 76 and the mixture of the flow and the air is passed through a static mixer 79 that has a very low pressure drop, to the down flowing oxidizer tower 50. The flow first passes through a heat exchanger 81 and then reaches a PrOx 82 comprising unconstrained catalyst pellets, which is possible due to the down flow configuration, thereby avoiding the need for captured oxidizer catalyst to prevent the catalyst from flowing. That is, since the force of gravity and force of the flow are in the same direction, very cheap PrOx catalyst pellets may be used in the down flow configuration.

Air necessary for the next step of oxidation is provided at an inlet 84, into a heat exchanger 85. Coolant is provided to the heat exchanger 85 at an inlet 87 and passes from an outlet 88 to an inlet 89 of the heat exchanger 81, after which it passes out through an outlet 90; the heated coolant may be utilized to provide heat to any ancillary apparatus. From the heat exchanger, the flow is into a second PrOx 94 and thence into a heat exchanger 95 having a water inlet 96 and a water outlet 97. The output of the heat exchanger 95 in a conduit 99 is hydrogen-rich reformate, similar in content to the reformate of the prior art.

The apparatus of FIG. 2 provides essentially the same result as the apparatus of the prior art described with respect to FIG. 1, except that it is very much less expensive due to use of loose oxidizer pellets. The invention occupies a much smaller volume, since the oxidizer pellets redistribute and mix the flow, eliminating the need for mixers (26, 32a, FIG. 1) before the oxygenating catalyst. The improved water vaporization crated by the counterflow of the atomized water and the CPO output allows the shift reactors to be smaller, and use of more water reduces the amount of CO that must be removed in the PrOx tower, thus reducing the volume thereof.

Figure 3:
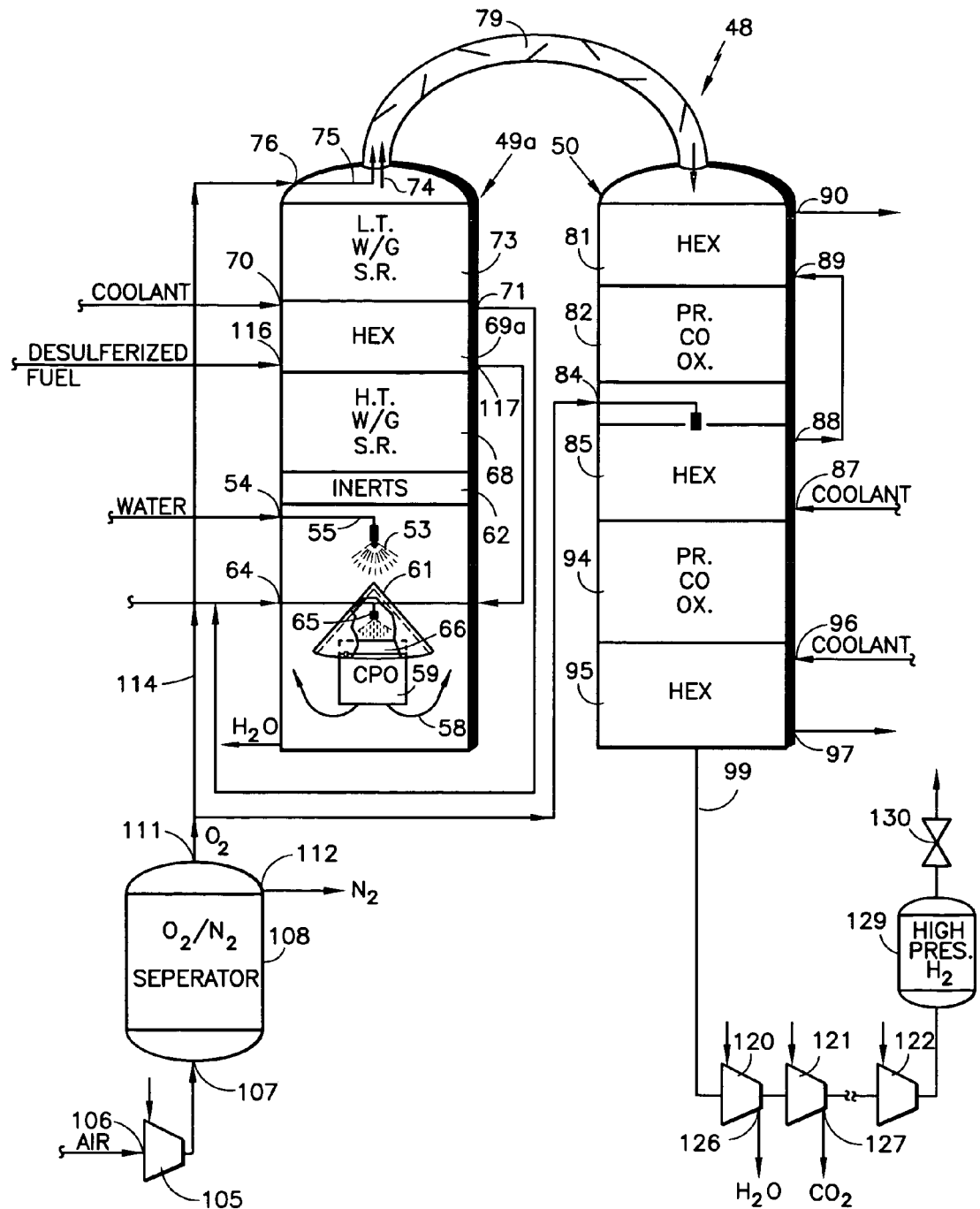
FIG. 3 is a simplified, stylized schematic diagram of a fuel processing system for generating, in a segregated fashion, high pressure hydrogen, nitrogen, and $CO_2$, in accordance with the present invention.

Another aspect of the present invention is illustrated in FIG. 3. Therein, instead of utilizing humidified air at the inlet 64, the present invention utilizes essentially pure, unhumidified oxygen. In FIG. 3, a fuel processing system 48 includes a compressor 105 which receives air at an inlet 106 and provides the air to the inlet 107 of an oxygen/nitrogen separator 108. The separator 108 may be a conventional pressure swing adsorption separator. This provides substantially pure (over 99%) oxygen at one outlet 111 and nitrogen, and other components of the atmosphere, at a second outlet 112. The nitrogen may be utilized in any suitable fashion, so as to not go to waste, and thereby provides one of the efficiency advantages of the fuel processing system 104 of the invention. The nitrogen may be used to purge the fuel processing system 104 by application to the $O_2$ inlets 64, 76, 84, temporarily, at startup, and to purge a related fuel cell stack (if any) at startup.

The oxygen is provided on conduits 114 to the inlets 64, 76, and 84, described hereinbefore with respect to FIG. 2. In the embodiment of FIG. 3, the reformer tower 49a differs from the tower 49 of FIG. 2 in that the heat exchanger 69a has two coolant passages, one passing coolant between the inlet 70 and the outlet 71 and another one passing desulfurized fuel from an inlet 116 to an outlet 117. The outlet 71 is interconnected with the conduit 114 so as to provide a mix of oxygen and steam at the inlet 64. The outlet 117 is connected at the nozzle 65 so as to add desulfurized fuel to the oxygen/steam mixture from the inlet 64, before it is thoroughly mixed in the distributor 66. The efficiency is thus increased by utilizing the high temperature water/gas shift reactor 68 to vaporize the fuel from the outlet 117 and the water from inlet 54.

The remainder of the fuel processing system 104 is similar to that described in FIG. 2 except for the fact that there is no nitrogen flow through the towers 49a, 50. Since nitrogen comprises about 78% of air, and oxygen comprises about 21% of air, with only oxygen and no nitrogen flowing through the fuel processor 104, the volume of the fuel processor can be significantly reduced, the effectiveness of all of the catalysts being increased nearly four times. This is an important aspect of the present invention.

Another aspect of the present invention illustrated in FIG. 3 is the fact that hydrogen does not have to be separated from the reformate, as in the prior art, before it is put to use. Instead, a series of compressors 120-122 are utilized to compress the reformate. In the first compressor 120, at about 860 kPa (125 psig), the water in the reformate is easily condensed and separated at an outlet 126. Similarly, at about 59 Bar (850 psig), $CO_2$ is condensed to liquid and separated from the reformate at an outlet 127. Additional compressors as necessary, such as the compressor 122, are utilized to provide hydrogen at the desired pressure within a high pressure hydrogen storage and/or dispensing unit 129, which may be dispensed through a valve 130 in a conventional fashion. Typically, the pressure increase that can be experienced in each one of the various compressors 120-122 is on the order of 6700 kPa (1000 psig) to 34,500 kPa (5000 psig), and the nature and number thereof can be selected to suit any particular utilization of the present invention.

The aforementioned patents are incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A fuel processing system for generating (a) substantially pure, nitrogen-free hydrogen and (b) segregated nitrogen and carbon dioxide, comprising:
   a source of air;
   a source of hydrocarbon fuel;
   a first vertical chamber having a gas flow outlet at the top thereof;
   a source of downwardly impelled water droplets;
   a separator for separating substantially pure oxygen out of the air from said source of air;
   a generator of hydrogen-rich gas disposed beneath said source of water droplets and receiving into an upper end thereof a mixture including oxygen derived from said source of air and liquid hydrocarbon fuel from said source of fuel, said oxygen being derived from said separator which provides substantially pure oxygen to said generator, said generator having a shield to prevent said water droplets from impinging on said generator, said generator providing at a lower end thereof a gaseous mixture including, inter alia, hydrogen, carbon dioxide and carbon monoxide, said gaseous mixture flowing upwardly through said downwardly impelled droplets toward said outlet;
   at least one water/gas shift reactor disposed above said source of water droplets, said droplets substantially vaporizing within said flow of gaseous mixture before entering said at least one water/gas shift reactor;
   a second vertical chamber having a gas flow inlet at the top thereof and a gas flow exit at the bottom thereof;
   a static mixer connecting said inlet with said outlet;
   at least one preferential carbon monoxide oxidizer (PrOx) consisting of a bed of preferential carbon monoxide oxidizer catalyst downstream of said generator below said inlet, receiving oxygen derived from said separator which provides substantially pure oxygen to said PrOx, and providing a nitrogen-free output gas flowing through said gas flow exit having less than about 100 parts per million of carbon monoxide; and
   at least two compressors connected in serial gas flow relationship with said output gas flowing through said gas flow exit, the pressure of gas exiting one of said compressors being sufficiently high to condense water from the gas exiting said one compressor, the pressure of gas exiting another of said compressors being sufficiently high to condense carbon dioxide from the gas exiting said another of said compressors, thereby providing substantially pure, nitrogen-free hydrogen.

2. A fuel processing system, comprising:
   a source of air;
   a source of hydrocarbon fuel;
   a vertical chamber having a gas flow outlet at the top thereof;
   a source of downwardly impelled water droplets;
   a generator of hydrogen-rich gas disposed beneath said source of water droplets and receiving into an upper end thereof from an entrance above said generator a mixture including oxygen derived from said source of air and hydrocarbon fuel from said source of fuel, said generator having a shield to prevent said water droplets from impinging on said generator, said generator providing at a lower end thereof a gaseous mixture including, inter alia, hydrogen, carbon dioxide and carbon monoxide, said gaseous mixture flowing upwardly through said downwardly impelled droplets toward said outlet; and
   at least one water/gas shift reactor disposed above said source of water droplets, said droplets substantially vaporizing within said flow of gaseous mixture before entering said at least one water/gas shift reactor.

3. A fuel processing system, comprising:
   a source of air;
   a source of hydrocarbon fuel;
   a first vertical chamber having a gas flow outlet at the top thereof;
   a source of downwardly impelled water droplets;
   a generator of hydrogen-rich gas disposed beneath said source of water droplets and receiving into an upper end thereof from an entrance above said generator a mixture including oxygen derived from said source of air and hydrocarbon fuel from said source of hydrocarbon fuel, said generator providing a gaseous mixture including, inter alia, hydrogen, carbon dioxide and carbon monoxide flowing upwardly toward said outlet;
   a second vertical chamber having a gas flow inlet at the top thereof connected with said outlet and a gas flow exit at the bottom thereof; and
   at least one preferential carbon monoxide oxidizer consisting of a bed of preferential carbon monoxide oxidizer catalyst below said inlet, receiving oxygen derived from said source of air, and providing an output gas flowing through said gas flow exit having less than about 100 parts per million of carbon monoxide.

4. A fuel processing system for generating (a) nitrogen-free hydrogen and (b) segregated nitrogen and carbon dioxide, comprising:
   a source of air;
   a source of hydrocarbon fuel;
   a separator for separating substantially pure oxygen out of the air from said source of air;
   a generator of hydrogen-rich gas receiving a mixture including hydrocarbon fuel from said source of fuel and oxygen derived from said separator, which provides substantially pure oxygen to said generator, said generator providing a nitrogen-free gaseous mixture including, inter alia, hydrogen, carbon dioxide and carbon monoxide;

at least one preferential carbon monoxide oxidizer (PrOx) consisting of a bed of preferential carbon monoxide oxidizer catalyst downstream of said generator, receiving oxygen derived from said separator which provides substantially pure oxygen to said oxidizer, and providing a nitrogen-free output gas having less than about 100 parts per million of carbon monoxide; and at least two compressors connected in serial gas flow relationship with said output gas, the pressure of gas exiting one of said compressors being sufficiently high to condense water from the gas exiting said one compressor, the pressure of gas exiting another of said compressors being sufficiently high to condense carbon dioxide from the gas exiting said another of said compressors, thereby providing substantially pure, nitrogen-free hydrogen.

5. A fuel processing system for generating (a) substantially pure, nitrogen-free hydrogen and (b) segregated nitrogen end carbon dioxide, comprising:

a source of air;

a source of hydrocarbon fuel;

a first vertical chamber having a gas flow outlet at the top thereof;

a source of downwardly impelled water droplets disposed within said first vertical chamber;

a separator for separating substantially pure oxygen out of the air from said source of air;

a generator of hydrogen-rich gas disposed beneath said source of water droplets and receiving into an upper end thereof a mixture including oxygen and liquid hydrocarbon fuel from said source of fuel, said oxygen being derived from said separator which provides substantially pure oxygen to said generator, said generator having a shield to prevent said water droplets from impinging on said generator, said generator providing at a lower end thereof a gaseous mixture including, inter alia, hydrogen, carbon dioxide and carbon monoxide, said gaseous mixture flowing upwardly within said first vertical chamber through said downwardly impelled droplets toward said outlet;

at least one water/gas shift reactor disposed within said first vertical chamber above said source of water droplets, said droplets substantially vaporizing within said flow of gaseous mixture before entering said at least one water/gas shift reactor;

a second vertical chamber having a gas flow inlet at the top thereof and a gas flow exit at the bottom thereof;

a static mixer connecting said inlet with said outlet;

at least one preferential carbon monoxide oxidizer (PrOx) disposed within said second vertical chamber consisting of a bed of preferential carbon monoxide oxidizer catalyst downstream of said generator below said inlet, receiving oxygen derived from said separator which provides substantially pure oxygen to said PrOx, and providing a nitrogen-free output gas flowing through said gas flow exit having less than about 100 parts per million of carbon monoxide; and at least two compressors connected in serial gas flow relationship with said output gas flowing through said gas flow exit, the pressure of gas exiting one of said compressors being sufficiently high to condense water from the gas exiting said one compressor, the pressure of gas exiting another of said compressors being sufficiently high to condense carbon dioxide from the gas exiting said another of said compressors, thereby providing substantially pure, nitrogen-free hydrogen.

6. A fuel processing system, comprising:

a source of air;

a source of hydrocarbon fuel;

a vertical chamber having a gas flow outlet at the top thereof;

a source of downwardly impelled water droplets disposed within said first vertical chamber;

a generator of hydrogen-rich gas disposed beneath said source of water droplets and receiving into an upper end thereof from an entrance above said generator a mixture including oxygen derived from said source of air and hydrocarbon fuel from said source of fuel, said generator having a shield to prevent said water droplets from impinging on said generator, said generator providing at a lower end thereof a gaseous mixture including, inter alia, hydrogen, carbon dioxide and carbon monoxide, said gaseous mixture flowing upwardly within said first vertical chamber through said downwardly impelled droplets toward said outlet; and at least one water/gas shift reactor disposed within said first vertical chamber above said source of water droplets, said droplets substantially vaporizing within said flow of gaseous mixture before entering said at least one water/gas shift reactor.

7. A fuel processing system, comprising:

a source of air;

a source of hydrocarbon fuel;

a first vertical chamber having a gas flow outlet at the top thereof;

a source of downwardly impelled water droplets disposed within said first vertical chamber;

a generator of hydrogen-rich gas disposed beneath said source of water droplets and receiving into an upper end thereof from an entrance above said generator a mixture including oxygen derived from said source of air and hydrocarbon fuel from said source of hydrocarbon fuel, said generator providing a gaseous mixture including, inter alia, hydrogen, carbon dioxide and carbon monoxide flowing upwardly within said first vertical chamber toward said outlet;

a second vertical chamber having a gas flow inlet at the top thereof connected with said outlet and a gas flow exit at the bottom thereof; and at least one preferential carbon monoxide oxidizer disposed within said second vertical chamber consisting of a bed of preferential carbon monoxide oxidizer catalyst below said inlet, receiving oxygen derived from said source of air, and providing an output gas flowing through said gas flow exit having less than about 100 parts per million of carbon monoxide.

* * * * *